March 19, 1940.  J. J. GOUGH  2,194,223
ELECTRIC TOASTER
Filed Jan. 29, 1938   3 Sheets-Sheet 2
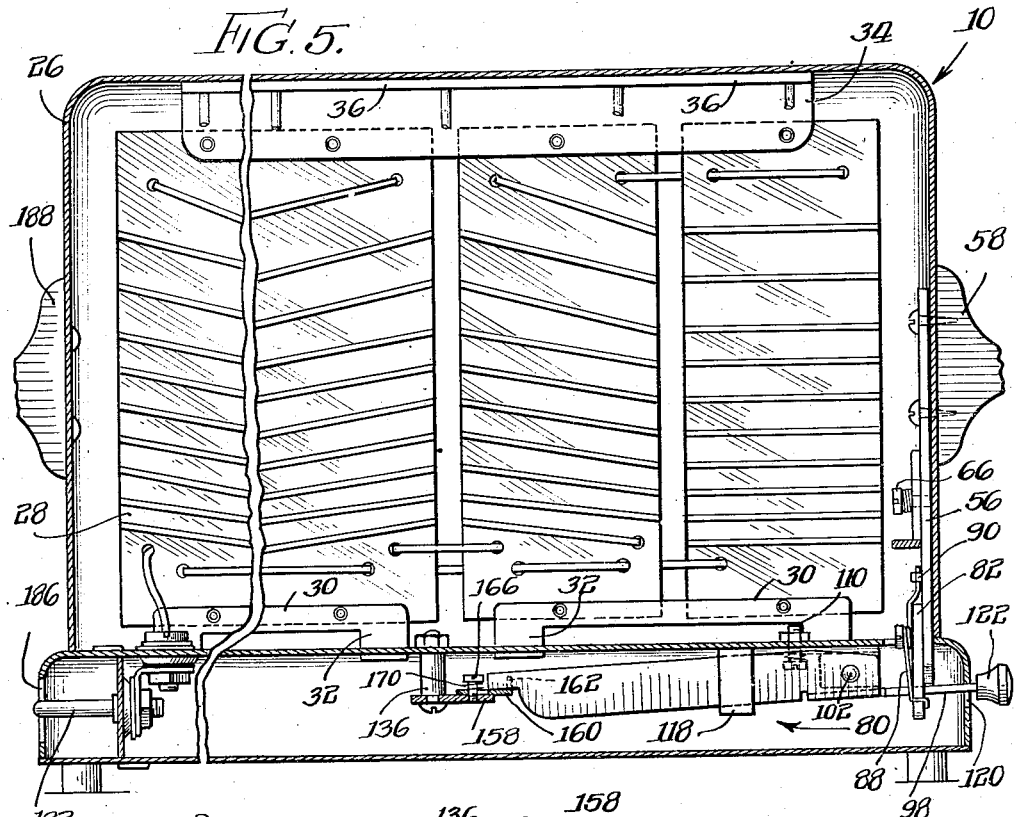
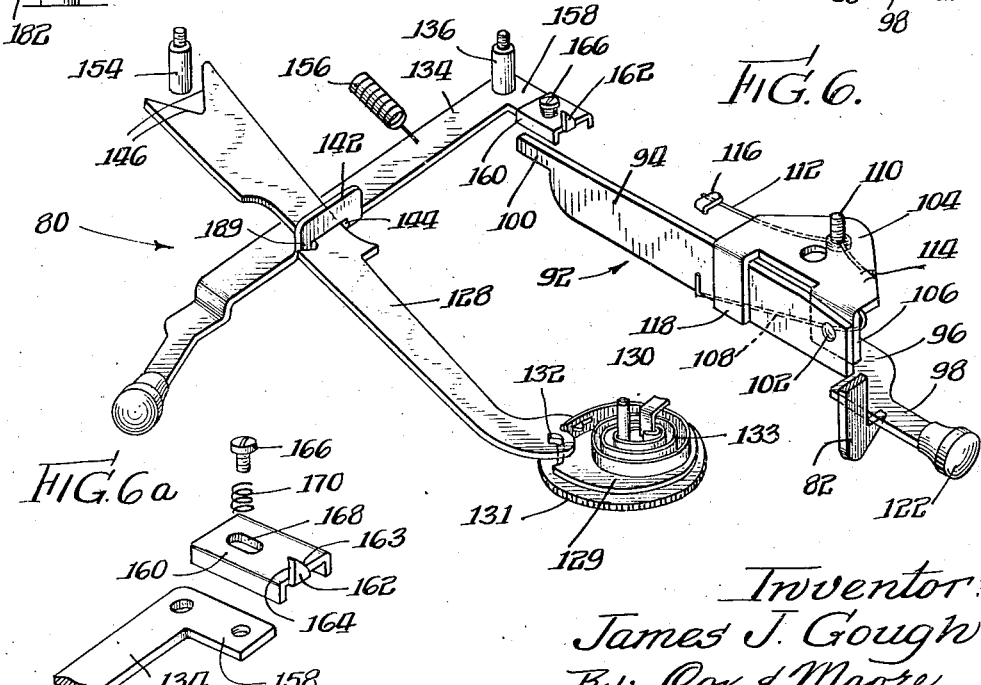
Inventor:-
James J. Gough
By:- Cox & Moore
attys.

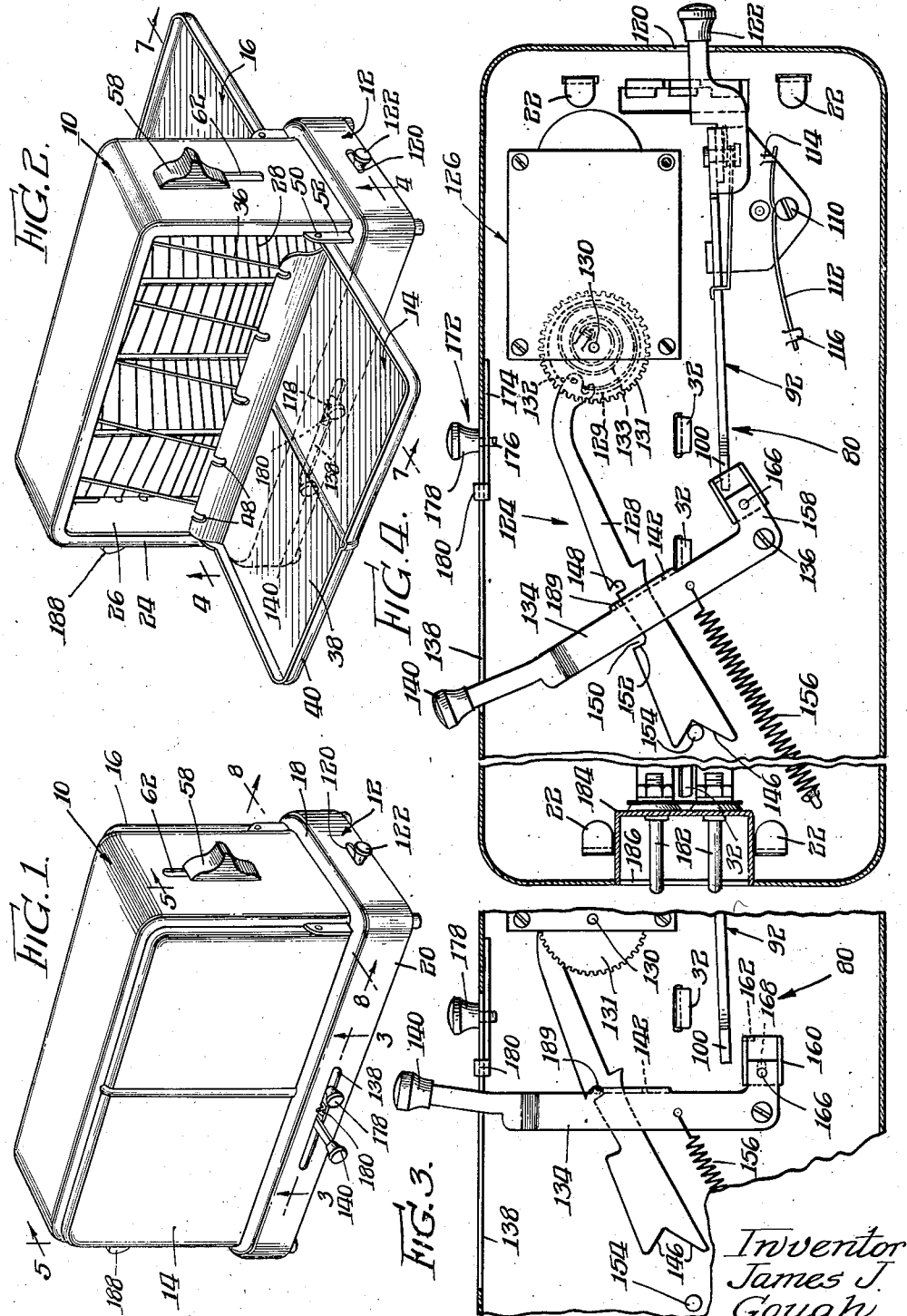

March 19, 1940. J. J. GOUGH 2,194,223
ELECTRIC TOASTER
Filed Jan. 29, 1938 3 Sheets-Sheet 3
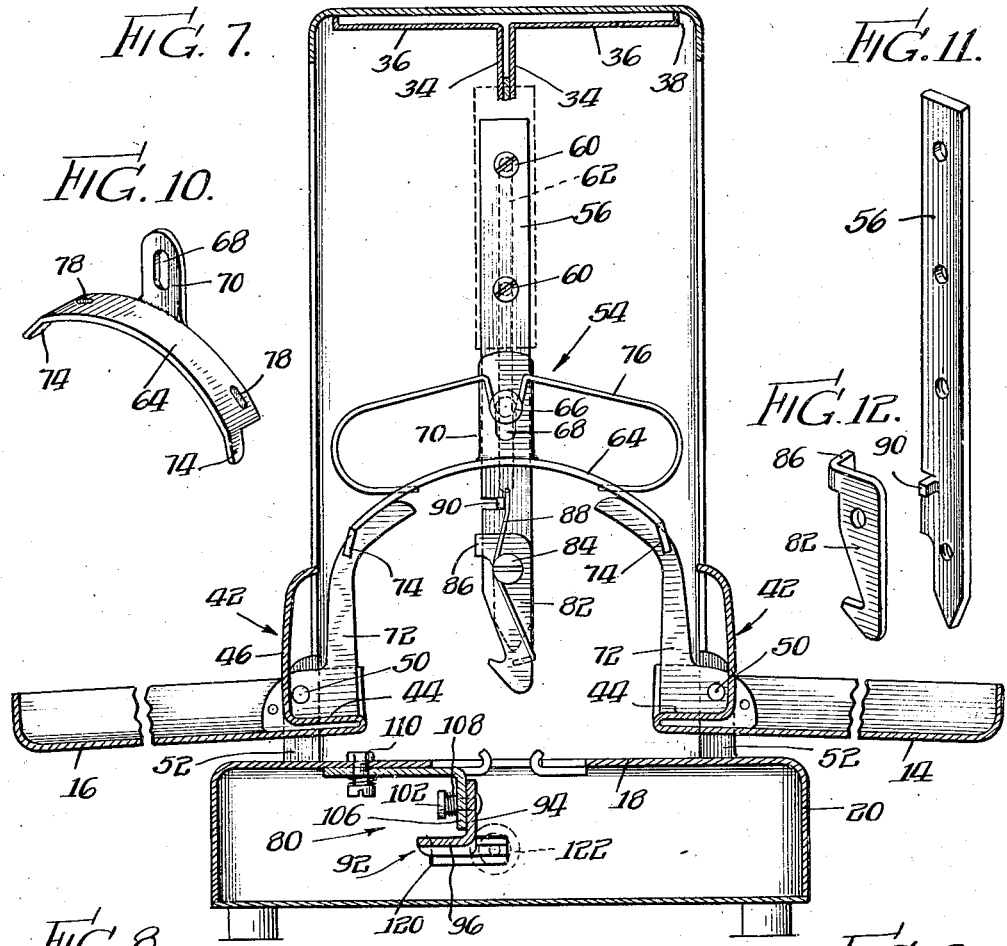
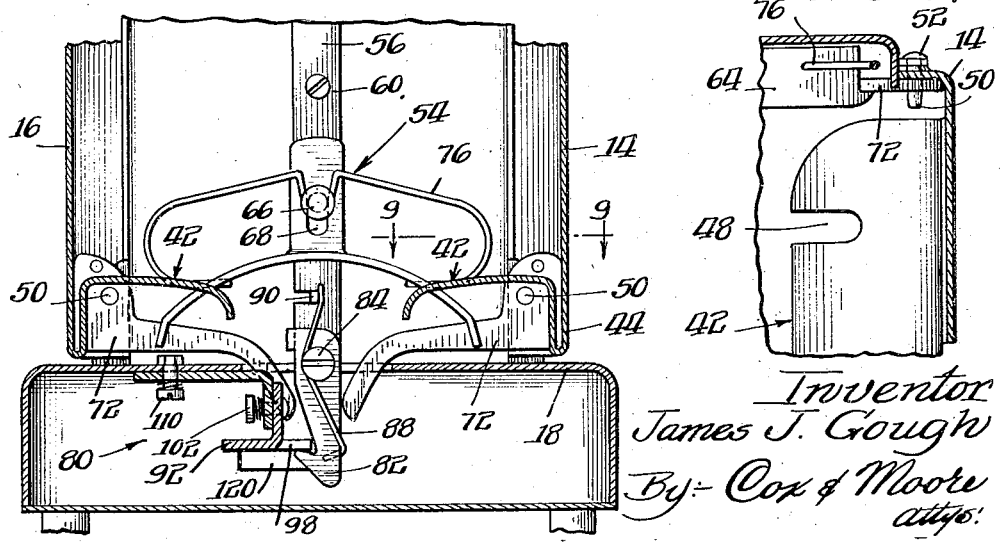
Inventor
James J. Gough
By: Cox & Moore
attys.

Patented Mar. 19, 1940

2,194,223

UNITED STATES PATENT OFFICE 2,194,223

ELECTRIC TOASTER

James J. Gough, Chicago, Ill., assignor to Chicago Electric Manufacturing Company, Chicago, Ill., a corporation of Illinois Application January 29, 1938, Serial No. 187,711

12 Claims. (Cl. 53—5)

This invention relates to electric toasters and has more particular reference to electric toasters of the type having a plurality of shiftable bread-receiving trays or doors.

An object of the invention is to improve the construction and decrease the manufacturing cost of toasters of this type.

Another object of the invention is to so construct a toaster of this type that the bread will be maintained warm after the toasting has been completed and until it is desired to eat it.

Another object of the invention is the provision of a toaster in which the bread-receiving trays or doors cooperate with the casing to provide a completely enclosed toasting compartment thereby to minimize the loss of heat from the compartment, which loss of heat has heretofore resulted from heat leakage around loosely fitting trays or doors.

A further object of the invention is the provision of a toaster having bread-receiving trays or doors of such construction as to prevent the bread or toast from sliding off the trays or doors when the same are opened to turn, inspect or remove the toast.

The invention further contemplates the provision of simple, compact and efficient means for latching the shiftable bread-receiving trays in closed or toasting position and for moving or releasing for movement said trays after a predetermined toasting time.

Another object of the invention is to provide readily operable means for closing and latching the shiftable bread-receiving trays or doors in closed position, which means is protected from the heat of the toasting unit.

A further object is the provision of a toaster of the type above stated, in which the bread-receiving trays are latched in closed or toasting position and are released for automatic opening after a predetermined toasting interval.

Another object of the invention is to provide common means for simultaneously moving the bread-receiving trays or doors to closed position, wherein means is provided for balancing unequal loads on the trays or doors whereby to prevent binding or warping of the trays or the closing means.

Other and further objects and advantages will be apparent from the following description when taken in connection with the accompanying drawings wherein:

Fig. 1 is a perspective view of a toaster embodying the invention.

Fig. 2 is a view similar to Fig. 1 but showing the bread-receiving trays or doors in opened positions.

Fig. 3 is a fragmentary, horizontal section taken along the line 3—3 of Fig. 1.

Fig. 4 is a horizontal section taken along the line 4—4 of Fig. 2.

Fig. 5 is a vertical section taken substantially along the line 5—5 of Fig. 1.

Figs. 6 and 6A are fragmentary views in perspective of certain parts of the time-controlled mechanism.

Fig. 7 is a vertical, transverse section taken along the line 7—7 of Fig. 2.

Fig. 8 is a fragmentary, vertical, transverse section taken along the line 8—8 of Fig. 1.

Fig. 9 is a fragmentary, horizontal section taken along the line 9—9 of Fig. 8.

Figures 10, 11, and 12 are views in perspective of different parts of a means for moving the doors or bread trays to closed position and for latching them in such position.

As shown in Figs. 1 to 4 of the drawings, the embodiment selected to illustrate the invention comprises a generally U-shaped casing 10 supported on a base 12 and fitted with shiftable bread-receiving trays or doors 14 and 16. The base 12 comprises a plate 18, preferably of metal and rectangular in shape, and provided with an integral, depending flange 20 extending peripherally thereof. The casing 10 is preferably of metal and is secured to the base 12 by lugs 22 extending through suitable openings in the plate 18 and bent over into engagement with the under surface of said plate. Each open side of the U-shaped casing 10 is provided with an inturned, continuous flange 24, with which flanges the bread-receiving trays or doors engage to completely enclose the space within the casing and form therewith a heating compartment or chamber 26.

Within this compartment 26 is mounted the usual heating element or elements 28, the heating element being secured to the base plate 18 by straps or bars 30 (Fig. 5) having depending lugs 32 which pass through suitable openings in the base plate and are bent over into locking engagement with the under surface of said plate. Top supporting plates 34 are located on opposite sides of the insulating base of the heating element 28 and are secured together and to the insulating base by means of suitable rivets or the like. The plates 34 are provided with oppositely bent body portions 36 and upwardly turned edges or flanges 38 for engaging the under surface of the top of the casing 10 to maintain the heating element in proper position within the heating compartment 26.

The usual protector wires or rods 36 (Fig. 1) extend between the top of the casing 10 and the base 12, these wires passing through suitable holes provided in the body portion 36 of each plate 34 and through suitable openings in the base plate 18. The wires 36 are twisted or swaged just above the base plate 18 to provide enlarged portions to secure them to the base plate. These wires or rods prevent the bread being toasted from engaging the heating elements.

Each of the bread-receiving trays or doors 14 and 16 comprises a plate 38 having a laterally directed flange 40 extending peripherally about three sides of the plate to form a pan, the depth of which is of the order of the usual thickness of a slice of bread, so that regardless of the speed at which it moves to open position, the bread-receiving tray will retain the toast therein, the flange 40 preventing the bread from sliding off the surface of the plate 38. The fourth, or lower, side of each bread-receiving tray 14 and 16 is provided with an integral extension member 42 having a portion 44 extending inwardly of the plate 38 and a portion or flange 46 extending laterally with respect to the plate 38 to form a slice-supporting shelf, the free end of the flange 46 being curved downwardly to provide a smooth, dull edge, spaced slots 48 extending inwardly of the free edge of the extension member 42 to receive the protector wires or rods 36.

Each of the trays or doors 14 and 16 is pivoted to the casing 10 by means of pins or the like 50 passing through upwardly extending lugs 52 formed at the lower side edges of the casing and through the flange 40 of the tray or door. The pivot pins 50 for each door lie in a plane inwardly of the center of the door when it is in closed position and the weight of the door, or the force of gravity, swings the door to its opened position.

The construction heretofore described provides a suitable and rigid toaster of pleasing appearance, the flanges on the doors, the casing and the base rigidifying the structure and minimizing the warping or deformation which in previous toasters resulted in loosely fitting doors and a consequent loss of heat from the toasting compartment as well as an impairment of the appearance of the toaster.

Common means 54 is provided for moving the trays or doors to closed or toasting positions. This means comprises a bar 56 to which is secured a handle 58 of any suitable heat insulating material by means of screws 60 passing through a slot or opening 62 in one side wall of the casing 10. A cross bar or cam lever 64 is pivotally mounted on the lower end of the bar 56 by means of a pin 66 secured to the bar 56 and extending through a slot 68 in a lug 70 projecting upwardly from the cross bar or cam lever. The cross bar or cam lever 64 overlies at its opposite ends arms or levers 72 secured to the trays or doors 14 and 16 at their lower edges and within a housing formed by the portions 44 and 46 of the extension members 42. Each lever 72 is curved at its outer free end to form a cam surface for engaging the cross bar or cam lever 64 and the latter is provided with guide fingers 74 at its opposite free ends to maintain the cam lever and the arms or levers 72 in proper operating relation.

The cam lever 64 may be of such a material and so dimensioned as to possess a certain amount of resilience permitting slight independent deflection of one end portion relative to the opposite end portion thereof.

A looped spring 76 has its center portion looped under the pin 66 and its free end portions secured to the cross bar or cam lever 64, openings or slots 78 being provided in the cam lever 64 to receive the free ends of said spring. It will be apparent that the pin and slot connection between the cam lever 64 and the operating bar 56 permits tilting of the lever relative to the bar and also permits relative movement longitudinally of the bar. The spring 76 and the resiliency of the cam lever 64 maintain the lever in proper engagement with the arms or levers 72 and the spring 76 cooperating with the lever 64 resiliently urges the trays or doors 14 and 16 into close-fitting engagement with the flanges 24 of the casing 10.

Inaccuracies in the spacing of the door pivot pins 50 from the center of the operating bar are compensated for by a tilting of the cam lever 64 above its pivot pin 66. Tilting of the cam lever 64 about its pivot pin 66 also prevents tilting of the operating bar and the binding of the screws 60 in the slot 62 when an unequal load or a different number of slices is placed on the opposite trays or doors 14 and 16. If the cross bar or cam lever 64 were formed integrally with, or rigidly secured to, the operating bar 56, inaccurate spacing of the door pivot pins from the center of the bar and unequal loading of the doors would cause a tilting of the bar 56 with a consequent binding of the same by engagement of the screws 60 with the edges of the slot 62. However, since in applicant's construction the cross bar or cam lever 64 is tiltably mounted on the bar 56, the latter will remain in a true vertical position irrespective of the tilting of the cam lever.

Time-controlled latching means 80 (Figs. 3 to 8) maintains the doors in closed or toasting position for any desired period of time. This means comprises a latch lever or hook 82 journaled on a pivot pin 84 secured to the lower end of the operating bar 56. A laterally extending projection or lug 86 formed on the latch lever 82 engages one edge of the operating bar 56 to limit the movement of the latch lever in one direction relative to the bar 56. A spring, wire or strip 88 has its central portion looped about the pivot pin 84 and its opposite end portions engage the latch lever 82 and a lug 90 struck out from the operating bar 56. The spring 88 therefore urges the latch lever in a clockwise direction (Figs. 7 and 8) and normally retains the lug 86 of the latch lever in engagement with the edge of the bar 56. The latch lever 82 is adapted to engage a latch bar 92, as shown in Fig. 8, when the operating bar 46 is moved to its lowermost position wherein the doors 14 and 16 are in closed or toasting position.

The latch bar 92 comprises a central, vertical portion 94 bent from and extending at right angles to a horizontal portion 96, an end portion 98 of reduced width and an opposite end portion of reduced thickness forming a finger 100. The latch bar 92 is pivotally mounted by a horizontal pin 102 on a supporting plate 104, the bar being loosely journaled on the pivot pin 102 and the pivot pin being secured to and passing through a depending lug 106 of the plate 104. A wire, spring or resilient strip 108 is looped about the pin 102 and engages at its opposite end portions the central portion 94 of the latch bar 92 and the horizontal surface of the plate 104. The spring 108 therefore urges the latch bar 92 in a counterclockwise direction (Fig. 6).

The supporting plate 104 is pivoted to the under surface of the base plate 18 by means of a pin or screw 110 on which the plate is loosely journaled, the pin 110 being secured to the base plate 18. A wire, spring or resilient strip 112 is looped about the pin 110 and at its opposite ends engages a lug 114 struck from the plate 104 and a lug 116 struck from the base plate 18. The spring 112 urges the plate 104 in a clockwise direction in Fig. 6, and in a counterclockwise direction in Fig. 4, and normally urges the latch bar 92 into position to be engaged by the latch lever or hook 82. The plate 104 is provided with a depending lug 118 spaced from the lug 106 and forming with the latter means for guiding the vertical swinging movement of the latch bar. The reduced end portion 98 of the latch bar extends through a slot or opening 120 in the flange 20 of the base plate 18 and carries exteriorly thereof an operating knob or handle 122 of heat insulating material.

Timing means 124 is provided for swinging the latch bar 92 and supporting plate 104 about the pivot 110 thereby to release the latch bar from the latch lever or hook 82. This timing means comprises a timing mechanism 126 which is set in operation by a lever or link 128 and in turn controls the return movements of said link.

The timing mechanism comprises a torsion spring or driver 129 for driving a shaft 130 to which is secured a gear 131. The link 128 is pivotally connected by a pin 132 to a ring 133 press fitted or otherwise frictionally associated with the hub of the gear 131. The torsion spring or driver 129 is secured to one end of the lever or link 128 at a point spaced from the pin 132 so as to urge the link 128 in a clockwise direction, as seen in Fig. 4, and in a counterclockwise direction, as seen in Fig. 6. The spring is compressed or set in motion by a movement of the lever 128 to the right in Figs. 3, 4 and 6. The movement of the gear 131 is controlled through a train of gears by suitable escapement mechanism (not shown). The greater the movement of the lever 128 to the right, the greater will be the time required to return it to its original position. The lever or link 128 is operated by, and in turn operates, a timing or setting bell crank 134. The bell crank 134 is journaled on a pin 136 secured to, and depending from, the base plate 18. One arm of the bell crank 134 extends through an elongated slot or opening 138 in the flange 20 of the base plate 18 and is provided at its free end with an operating knob or handle 140 of heat insulating material. This same arm of the bell crank is provided with an upwardly extending lug 142 having an elongated slot 144 therein through which passes the lever or link 128.

The lever or link 128 is provided with a substantially V-shaped cam groove 146 extending inwardly from the free end edge thereof, a central notch or groove 148, and an elongated groove or recess 150 merging into the notch or groove 148 and forming at its other end a shoulder 152. A pin 154, fixedly secured to and depending from the base plate 18, cooperates with the cam groove 146 to swing the lever 128 in a counterclockwise direction as seen in Fig. 4, and in a clockwise direction as seen in Fig. 6.

A coiled spring 156 urges the bell crank 134 in a counterclockwise direction as seen in Fig. 4 and in a clockwise direction as seen in Fig. 6.

The other and short arm 158 of the bell crank carries a generally U-shaped cam or tripping pawl 160 having a depending projection or trip finger 162. The trip finger 162 has a curved or beveled cam face 163 and a straight or vertical releasing face 164. The cam or tripping pawl 160 is secured to the arm 158 of the bell crank by means of a pin 166 fixed to said arm and passing through an enlarged opening or slot 168 in the cam or tripping pawl. A coiled spring 170 encircles the pin 166 and is interposed between the head of said pin and the cam or tripping pawl 160 for retaining the latter in the position shown in Fig. 5. The pin and slot connection between the cam or pawl and the arm 158 of the bell crank permits the pawl to tilt vertically thereon so that the trip finger in moving in one direction from one side to the other of the latch bar 92 will not operate said bar.

Adjustable means 172 is provided for limiting the setting movements of the bell crank 134 to adjust the toasting time. This means 172 comprises a plate 174 mounted behind the slot or opening 138 in the flange 20 in a position to engage the outwardly extending arm of the bell crank 134. The plate 174 is adjustably secured to the flange 20 by means of a screw 176 threaded thereinto and passing through the slot or opening 138. A knob or handle 178 is secured to the outer end of the screw 176, the diameter of the inner end of the knob being greater than the width of the slot or opening 138 so that upon manipulation of the screw 176, this operating knob will engage the flange 20 about the edges of the slot 138 and clamp the plate 174 in adjusted position thereon. The plate 176 may be provided with a projection 180 extending into or through the slot 138 and cooperating with suitable indicia (not shown) representative of the various time intervals.

The customary terminal prongs 182 (Fig. 4), electrically connected to the opposite ends of the heating element 28, are mounted on, and insulated from, a U-shaped bracket 184 secured to the under surface of the base plate 17 behind a plug-receiving opening 186 in the flange 20 at one end of the base 12.

A handle 188 of heat insulating material and similar in shape and appearance to the handle 58 may be secured to the casing 10 at an end opposite the end on which the handle 58 is mounted. This additional handle not only imparts a symmetrical appearance to the toaster, but also provides with the handle 58 means for readily lifting the toaster.

The operation of applicant's toaster is as follows:

The doors or trays 14 and 16 being in closed position, in which position they are held by the engagement of the latch bar 92 with the latch 82, are opened by manually manipulating the knob or handle 122 to rotate the latch bar 92 about its vertical pivot 110, thereby releasing the latch 82 and permitting the doors to gravitate to open position.

The slices of bread to be toasted are then placed in the trays or doors 14 and 16 and the handle 58 depressed to lower the bar 56 and through the cam bar 64 to operate the levers 72, thereby swinging the doors into closed position, in which position the peripheral flanges 40 engage the peripheral flange 24 of the casing 10. The latch 82 moves downwardly with the bar 56 and engages the under surface of the horizontal portion 96 of the latch bar 92, thereby to latch the doors in closed position and tilt the bar 92 into the path of the tripping pawl 160. The plate 174 having been adjusted in accordance with the desired toasting time, the bell crank 134 is manually moved into engagement with said plate. This movement of the bell crank is first independent of the lever 128 and then, as the lug 189 on the bell crank engages in the notch or groove 148, the lever or link 128 is moved in unison with the bell crank to effect a winding of the torsion spring 129. During this setting movement of the bell crank, the cam or tripping pawl 160 passes from the upper side of the latch bar 92, as seen in Fig. 4, to the lower side of the bar, as seen in Fig. 3; or from the left side of the bar to the right side of the bar, as seen in Fig. 6, the beveled cam face 163 of the trip finger 162 engaging the bar 92 and causing the tripping pawl 160 to tilt about its pin 188 so that the bar 92 remains unoperated by this setting movement of the bell crank 134.

The movement of the lever link 128 in the opposite direction is controlled by the timing mechanism 126. As the link 128 approaches its limit of movement in the return direction, the pin 154 engages the face of the cam groove 146 and moves the link counterclockwise, as seen in Figs. 3 and 4, and clockwise, as seen in Fig. 6, to release the lug 189 of the bell crank 134 from the notch 148. The spring 156 then snaps the bell crank 134 through the remaining portion of its movement and during this movement the releasing face 164 of the cam or tripping pawl 160 engages the latch bar 92 and causes this bar to rotate about its vertical pivot 110 in a clockwise direction, as seen in Fig. 4, and in a counterclockwise direction, as seen in Fig. 6, to release the latch 82. When the bar 92 has disengaged the latch 82, the spring 108 moves the bar about the horizontal pivot 102 in a clockwise direction, as seen in Fig. 6, to clear the trip finger 162 of the trip pawl 160 and the spring 112 then rotates the bar about its pivot pin 110 into its original position. Upon release of the latch 82, the trays or doors gravitate into their open positions.

The heating element of the toaster may be left energized and the heat of the element conducted to the toast on the open trays, which trays have been well heated during the time that the doors were closed. The electrical energy may be cut off and the toaster used as a warming-over oven since the doors form with the casing a completely enclosed heating compartment capable of retaining the heat therein for a considerable period after the heating element has been de-energized.

It will be seen from the foregoing that applicant has provided a toaster economical to manufacture, which has a completely enclosed toasting compartment and which maintains the toast warm until it is eaten.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. In an electric toaster having oppositely disposed shiftable doors, common operating means for moving said doors to closed position, said means comprising a reciprocable actuating member, a member yieldably pivoted on said actuating member, and means engaging said last mentioned member on opposite sides of its pivot and connected to said doors.

2. In an electric toaster having oppositely disposed shiftable doors, means for moving said doors to closed position, said means comprising a reciprocable actuating member, actuated members connected to said doors, and means connecting said actuating member to said actuated members for balancing unequal loads on said doors.

3. An electric toaster comprising a casing having openings in its opposite sides, a plurality of closure means for said openings for receiving substance to be toasted, means for pivoting each of said closure means relative to said casing for movement automatically to open position, a manually operable member slidably mounted on said casing, a member secured to said manually operable member and extending transversely relative thereto, and means projecting inwardly from the pivoted ends of said closure means for engaging said transversely extending member whereby said closure means are simultaneously moved to closed position upon manipulation of said manually operable member.

4. An electric toaster comprising a casing having openings in its opposite sides, a pair of doors for receiving substance to be toasted, means for pivoting said doors on opposite sides of said casing for automatic movement from a position closing said openings to an open position, a manually operable bar slidably mounted on one end of said casing, a cross bar pivoted to said manually operable bar and arms projecting inwardly of the casing from the pivoted ends of said doors, said arms engaging said cross bar whereby upon manipulation of said manually operable bar said doors are simultaneously moved into closed position.

5. An electric toaster comprising a casing having openings in its opposite sides, closure means for receiving substance to be toasted, means for pivoting said closure means relative to said casing to close said openings and to move automatically to open position, a manually operable member slidably mounted on said casing, a member secured to said manually operable member and extending transversely relative thereto, means projecting inwardly from the pivoted end of said closure means for engaging said transversely extending member whereby said closure means may be moved to closed position upon manipulation of said manually operable member, means for latching said manually operable member in a position in which said closure means are in closed position, and means for automatically releasing the latching means after a predetermined time of toasting.

6. An electric toaster comprising a casing having openings in its opposite sides, a pair of doors for receiving substance to be toasted, means for pivoting said doors on opposite sides of said casing for movement from a position closng said opening automatically to open position, a manually operable bar slidably mounted on one end of said casing, a cross bar pivoted to said manually operable bar, arms projecting inwardly of the casing from the pivoted ends of said doors, said arms engaging said cross bar whereby upon manipulation of said manually operable bar said doors are simultaneously moved into closed position, means for latching said bar in a position in which said doors are in closed position, and means for automatically releasing the latching means after a predetermined time of toasting.

7. In an electric toaster, a casing, an article receiving tray shiftable from a non-toasting position to a toasting position relative to said casing, means for manually moving said tray from said non-toasting position to said toasting position, a latch carried by said manually operable means, a latch bar mounted on said casing for cooperation with said latch, a timing mechanism, shiftable means movable in one direction to set said timing mechanism and movable in the opposite direction under control of said timing mechanism, means for operating said latch bar to release said latch, means for automatically connecting said last mentioned means to said shiftable means for operation therewith, means for automatically disconnecting said latch bar operating means from said shiftable means after a predetermined movement, and means operable upon disconnection of said latch bar operating means from said shiftable means to snap said means into engagement with said latch bar whereby said latch bar is released with a snap action.

8. In an electric toaster, a casing, an article receiving tray shiftable from a non-toasting position to a toasting position relative to said casing, means for latching said tray in toasting position, operating means adapted to engage the latching means to release said latching means, time control means locking said operating means out of engagement with said latching means and releasing said operating means after a predetermined time for operative engagement with said latching means to snap said latching means into a released position.

9. In an electric toaster, a casing, an article receiving tray shiftable from a non-toasting position to a toasting position relative to said casing, manually operable means for moving said tray from said non-toasting position to said toasting position, a latch carried by said manually operable means, a latch bar mounted on said casing for cooperation with said latch, a timing mechanism, a second manually operable means connectible with the timing mechanism when moved in one direction for setting said timing mechanism, means for disconnecting said second manually operable means from said timing mechanism after a predetermined interval of time, and spring controlled means associated with the second manually operable means for snapping said latch bar out of engagement with said latch upon disconnection of said second manually operable means from said timing mechanism.

10. In an electric toaster, a heating element, an article receiving tray shiftable from a non-toasting to a toasting positon relative to said heating element, a reciprocable actuating member for moving said tray to toasting position relative to the heating element, a latch carried by said actuating member, a shiftable latch bar automatically engaging said latch to retain the tray in toasting position, a timing mechanism, a shiftable element operatively controlled by said timing mechanism, latch bar operating means automatically connectible to said shiftable element for movement therewith under the control of said timing mechanism, means operable upon movement of said shiftable element to a predetermined position to disconnect said last mentioned means from said element, and spring means operatively controlling said latch bar operating means when disconnected from said shiftable element for snapping the latch bar out of engagement with the latch when said latch bar operating means is released from the shiftable element.

11. In an electric toaster, a casing, an article receiving tray pivoted on said casing for movement from an open position to a closed position relative to the casing, a vertically reciprocable actuating member operatively connected to said tray for moving the tray to a closed position, a latch carried by said actuating member, a shiftable latch bar automatically engageable with said latch to retain the tray in closed position, a timing mechanism, a shiftable element operatively connected to said timing element, a manually operable lever automatically connectible with the shiftable element to effect a predetermined time setting adjustment of said timing mechanism and to be controlled by said timing mechanism, means operable upon movement of said shiftable element to a predetermined position under the control of said timing mechanism to disconnect said lever from said element, and means including a spring operatively connected to said lever for snapping the latch bar out of engagement with the latch upon release of the lever from the shiftable element.

12. In an electric toaster, a casing, an article receiving tray shiftable from a non-toasting to a toasting position relative to said casing, an actuating member for moving said tray to a toasting position relative to said casing, a latch carried by said actuating member, a latch bar automatically engaging said latch to retain the tray in toasting position, a timing means, a manually operable lever automatically connectible to said timing means to effect a predetermined time setting adjustment of said means, means for automatically releasing said lever from said timing means after a predetermined interval of time, said latch bar being pivoted for movement about a first axis to release the latch and pivoted about a second axis for movement into the path of movement of said lever, means including a spring associated with said lever for causing the lever when released from the timing means to snap the latch bar about its first axis out of engagement with the latch, and means operative upon release of the latch bar from the latch for shifting the latch bar about the second axis out of the path of movement of said lever.

JAMES J. GOUGH.